Oct. 31, 1967  F. L. HOIPKEMEIER  3,349,547
GAS SCRUBBER DEVICE
Filed May 31, 1966  2 Sheets-Sheet 1
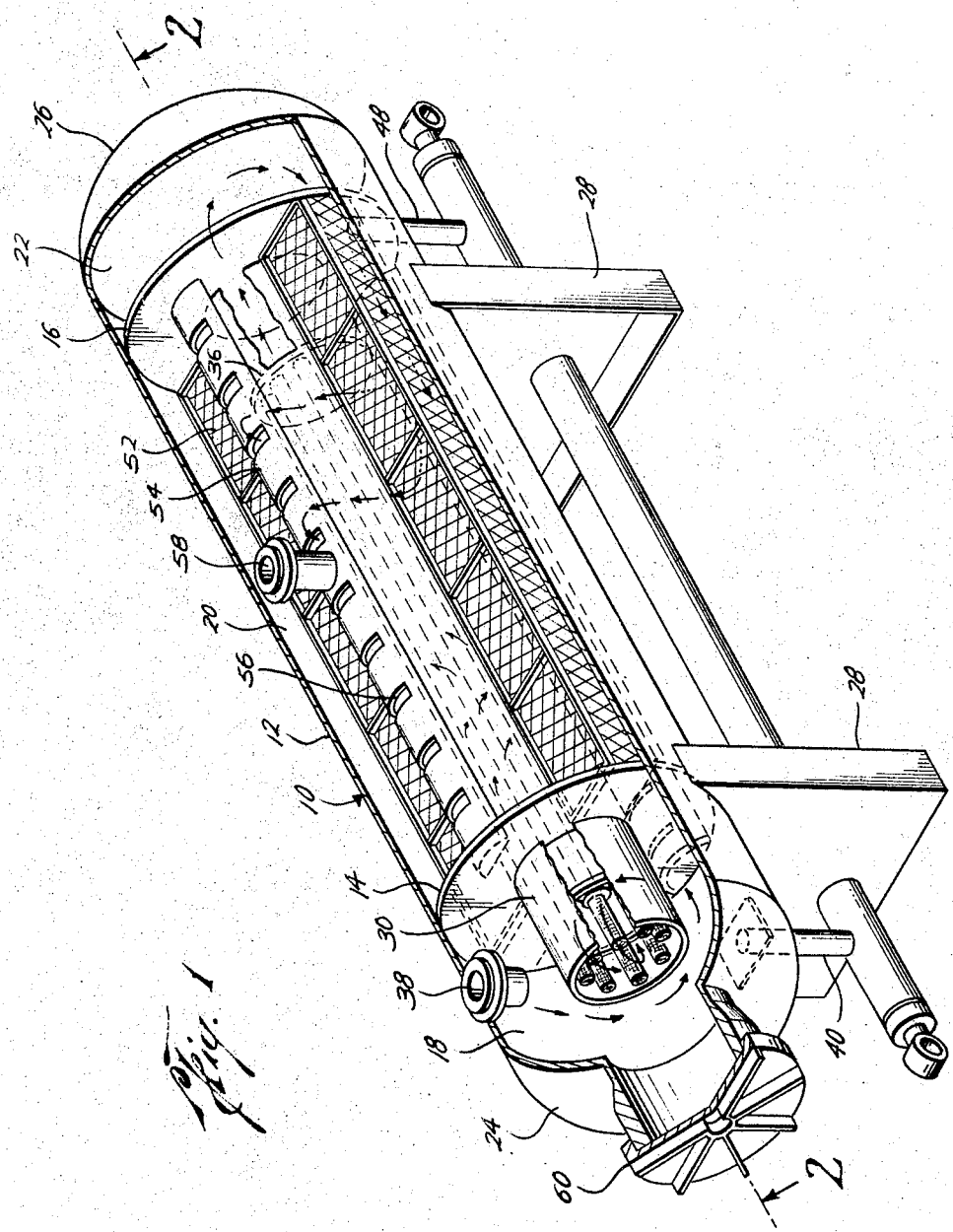
Fredrick L. Hoipkemeier
INVENTOR
James F. Weiler
BY Jefferson D. Giller
Dudley R. Dobie, Jr.
ATTORNEYS Oct. 31, 1967
F. L. HOIPKEMEIER
3,349,547
GAS SCRUBBER DEVICE
Filed May 31, 1966
2 Sheets-Sheet 2
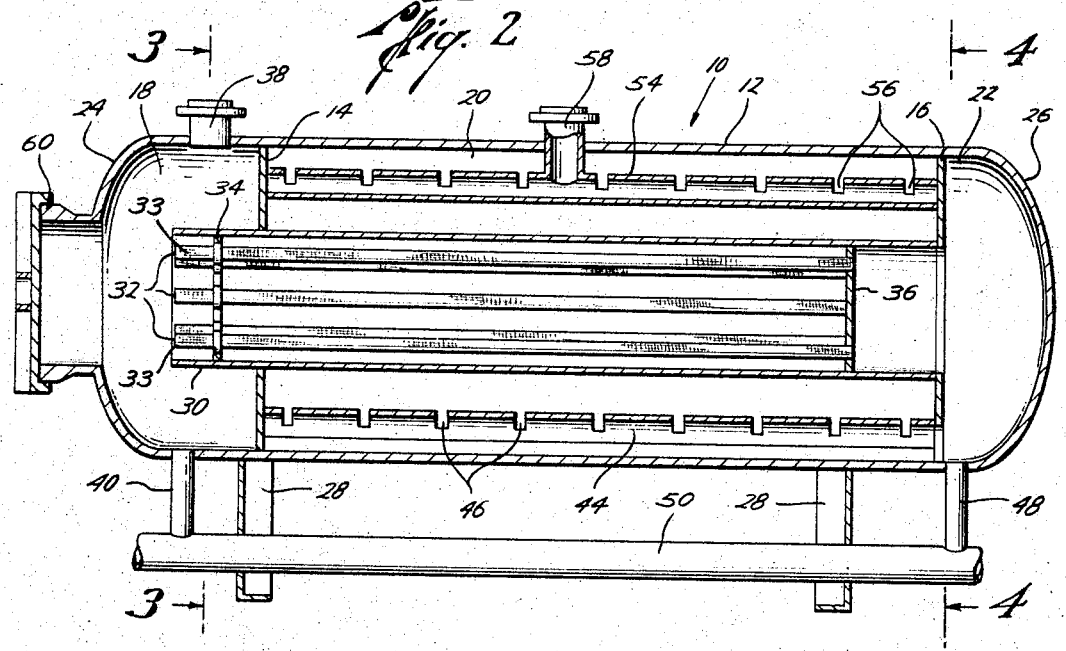
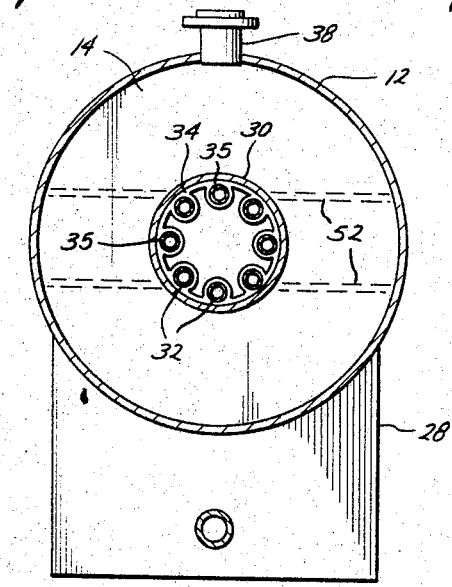 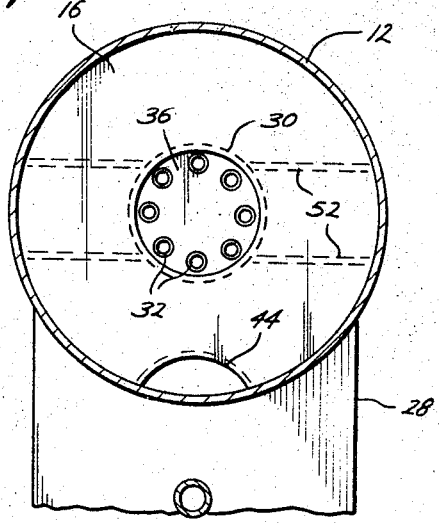
Fredrick L. Hoipkemeier
INVENTOR
BY James F. Wailes
Jefferson D. Gilles
Dudley R. Dobie, Jr.
ATTORNEYS 3,349,547
GAS SCRUBBER DEVICE
Fredrick L. Hoipkemeier, Oklahoma City, Okla., assignor to Black, Sivalls & Bryson, Inc., Kansas City, Mo., a corporation of Delaware
Filed May 31, 1966, Ser. No. 554,104
6 Claims. (Cl. 55—324)

ABSTRACT OF THE DISCLOSURE

A horizontal gas scrubber vessel having inlet, separation and terminal chambers. Filter tubes permit communication of the gas from the inlet to the terminal chamber and trap foreign solids; the gas passes from the terminal to the separation chamber wherein entrained liquid particles coalesce and are removed from the gas.

---

The present invention relates to a gas scrubber device and more particularly to an improved scrubber device for simultaneously filtering foreign solids and separating liquid particles from a gas stream.

There are many instances in the chemical process industry, petroleum refining industry as well as field operation in the oil and gas industry wherein gas streams must be purged of foreign solids and entrained liquid materials for proper processing. For example, finely divided solid particles and hydrocarbon mist in gas streams will contaminate dry dessicant beds and free water slugs will even shatter such beds. As a further example, petroleum gases in oil and gas fields are in many instances dried by glycol absorption techniques. Contamination of the glycol by foreign solids and hydrocarbon liquid particles in the gas causes undesirable foaming and increased consumption of glycol.

Heretofore in the art, filtration and separation of solids and liquids material has been an extremely inefficient operation in that large size, bulky and thus expensive equipment has been necessary to scrub and clean even very small volume gas streams. Short filter element life has been a perpetual problem as has been carry-over of liquid material when large slugs of such liquid build up in a gas stream. It would be highly advantageous to provide a scrubber device for removing foreign solids and entrained liquids from a gas stream wherein filtration and separation are effected simultaneously in a relatively small, economical vessel wherein both functions are carried out with great efficiency while promoting filter element life and eliminating carry-over of slugs of liquid material within the gas system. The present invention is directed to such an improved device.

It is, therefore, an object of the present invention to provide a device attaining the foregoing advantages, and particularly one with increased efficiency, greater economy, extended filter element life and reduced maintenance requirements.

A further object of the present invention is to provide an improved gas scrubber device having filtration means for removal of foreign solids integrally communicating with separation means for separating liquid particles entrained in the gas stream.

Another object of the present invention is to provide such an improved gas scrubber device having integrated filtration and separation means wherein the filtration means is spaced coaxially with the separation means to provide greater filtration capacity while maintaining efficiency in the separation means for large volumes of gas.

A still further object of the present invention is to provide an improved gas scrubber device having significantly longer filter life by means of tangential injection of the gas ahead of the filtration means which is axially spaced within the separating means whereby velocity of foreign solids is reduced prior to contact with said filtration means.

Still another object of the present invention is to provide an improved gas scrubber device having filtration means integrally spaced within separation means wherein the separation means promotes effective distribution of gas for more efficient separation of liquid particles entrained therein.

Yet a further object of this invention is the provision of an improved gas scrubber for filtering foreign solids and separating liquid particles from a gas stream generally comprising an elongate vessel having inlet, separation and terminal chambers with cylindrical filter element means axially spaced therethrough to form an integral scrubber unit whereby large filter elements may be used with a small space to handle great volumes of gas with efficiency and with relatively longer filter element life.

Other and further objects, features and advantages will be apparent from the following description of a presently preferred embodiment of the invention given for the purpose of disclosure, taken in conjunction with the accompanying drawings, where like character references designate like parts throughout the several views, and where:

FIGURE 1 is a partial perspective view of the improved gas scrubber device of the present invention.

FIGURE 2 is a cross-sectional side view of the present invention taken along the line 2—2 of FIGURE 1.

FIGURE 3 is an end view of the present invention partially in section taken along the line 3—3 of FIGURE 2, and FIGURE 4 is a cross-sectional end view of the present invention taken along the line 4—4 of FIGURE 2.

The present invention is directed generally to an improved means for removing foreign solids and liquid particles from a gas stream comprising filter element means, axially spaced within separation means with means for communicating gas from the filter element means to the separation means. Integral spacing of the filter element within the filter separation means provides an economical unit yet one wherein gas flow is uniquely distributed for effective liquid particle removal.

Referring now to the drawings and particularly to FIGURE 1, the reference numeral 10 generally refers to the improved gas scrubber device of the present invention. Secured within the cylindrical or elongate vessel 12 are two transverse partitions 14 and 16 forming an inlet chamber 18, an intermediate or separation chamber 20 and a terminal chamber 22. A dished head 24 encloses the vessel 12 around the inlet chamber 18 while the dished head 26 encloses the vessel around the terminal chamber 22. The vessel 12 is supported in a horizontal position by support members 28.

Mounted axially within the vessel 12 is a filter compartment 30 formed of a cylindrical shell extending through the transverse partitions 14 and 16. Further reference is made to FIGURE 2 for a more detailed explanation of the filter compartment. Horizontally disposed within the filter compartment or shell 30 are filter tubes 32 mounted at one end by a suitable bracket 34 and mounted at the other end by means of a transverse partition 36. The transverse partition 36 also serves to form a barrier to gas flow through the shell 30 and may or may not be in the same vertical plane as the transverse partition 16.

FIGURE 3 illustrates the inlet end of the filter compartment 30 having the filter tubes 32 mounted therein and better depicts the bracket 34 supporting the filter tubes. FIGURE 4 likewise shows the filter compartment or shell 30, the filter tubes 32 and the transverse partition 36 mounted within the filter compartment 30. Also connected to and surrounding the filter compartment 30 is the transverse partition 16 separating the separation chamber 20 and terminal chamber 22 as shown in FIGURE 2.

With reference again to FIGURE 2, an inlet nozzle 38 is provided to permit introduction of the gas stream into the inlet chamber 18 in a direction generally tangential to the walls of the vessel 12 to impart a generally circuitous flow to the gas. A drainage pipe 40 is provided at the bottom of the inlet chamber to permit drainage of heavy foreign solids and slugs of liquid entering with the gas stream.

Mounted within and near the bottom portion of the separation chamber 20 is a conduit 44 communicating with the terminal chamber 22 and extending substantially the length of the bottom of the separation chamber. The conduit 44 has slots 46 spaced along the length thereof for distributing flow of the gas stream from the terminal chamber in a generally even flow pattern to the bottom of the separation chamber over substantially the length of the separation chamber. The number and spacing of the flow slots will depend mainly upon velocity of the gas stream as is apparent. Also, located at the bottom of the terminal chamber is a pipe 48 for drainage of liquid that builds up in the terminal chamber. The pipe 48 communicates with a sump 50 as does the drainage pipe 40.

Referring once again to FIGURE 1, suitable wire mesh 52 is spaced along the length of the separation chamber bewteen the wall of the vessel 12 and the outer wall of the filter compartment 30. Alternatively and depending upon the diameter of the filtration chamber 30, the wire mesh may be mounted above and/or below the filtration chamber and extend across the full width of the separation chamber 20. The mesh of the wire to be used depends upon the velocity and liquid content of the gas stream as may be selected by one skilled in the art. The wire mesh 52 is preferably located at approximately the center of the vessel whereby the separation chamber is divided into upper and lower portions for purposes of gas flow.

With reference now to FIGURES 1 and 2, a horizontal conduit 54 is mounted within the separation chamber 20, and spaced below the top of the vessel wall 12. The conduit 54 has upper ports 56 for conducting the gas stream from the separation chamber through the outlet nozzle 58 for removal from the scrubber device.

The filter tubes 32 each are formed preferably of a tubular member having perforations 35 along its length for passage of the gas therethrough. The tube should be opened at the end communicating with the terminal chamber 22 and should be blocked or otherwise have very small perforations at the end located within the inlet chamber 18. The perforations along the length of the tubular member are preferably covered with a filtration media such as glass wool which may be held in place as for example by a cloth cover 33 although any suitable media may be used. Thus each filter tube is permeable to a gas stream but impermeable to foreign solids.

The filter compartment or shell 30 preferably extends substantially into the inlet chamber whereby a peripheral shield is formed around the filter tubes 32 to limit transverse flow of the gas stream upon entering the inlet chamber. The filter tubes are thus protected from the impact of high velocity solid particles which tend to deteriorate the filter tube. Thus promoted is axial flow of the gas stream after assuming the generally tangential or circuitous motion after entering the inlet chamber. Preferably provided also in the inlet chamber 18 is quick opening closure 60 for access to the filter tubes for maintenance purposes.

In operation and particularly with reference to FIGURE 1, the gas stream having foreign solids and liquid particles to be removed or scrubbed therefrom is injected into the inlet chamber 18 by means of the inlet nozzle 38 and assumes a generally circuitous flow as represented by the arrows in the drawing. The gas stream then enters the filter compartment 30 and assumes a generally axial flow which is blocked by the transverse partition 36 adjacent or near the terminal chamber 22. Thus the gas stream is forced through and into the filter tubes whereupon it passes to the terminal chamber 22. Heavy foreign solids or large slugs of liquid particles in the gas stream are removed therefrom initially by a cyclone effect and drawn off from the inlet chamber 18 by the pipe 40. Similarly, and liquid which coalesces on or within the filter tubes 32 passes into the terminal chamber 22 and may be drawn off by the pipe 48. Both pipes 40 and 48 communicate with the sump 50 for proper disposal of the liquid and solid material.

As the gas stream passes through the filter tubes 32, foreign solids in the gas are trapped on the surface of the filtration media around the filter tubes 32 and build up over a long period of time. Of course, maintenance is necessary to clean the tubes periodically. As the stream passes from the filter tubes into the terminal chamber 22, it reverses direction and communicates with the separation chamber 20 by means of the conduit 44 through the ports or flow slots 46 therein. The gas then passes up through the wire mesh 52 in the separation chamber 20 whereupon entrained liquid particles coalesce on the wire mesh and drop to the bottom of the separation chamber 20. The liquid gradually builds up and will back up into the terminal chamber 22 for draw off through the pipe 48 with the liquid previously mentioned. The gas stream continues its upward movement in the separation chamber 20 and passes through the upper ports 56 of the horizontal conduit 54 for draw off through the outlet nozzle 58. It thus becomes apparent that provision of the ports 56 in the upper extremity of the horizontal conduit 54 tends to eliminate liquid particles in the proximity of the wire mesh from carrying over into the outlet nozzle 58.

Thus provided is a scrubber device for removing foreign solids and entrained liquid particles from a gas stream wherein filtration and separation steps are effected simultaneously in a relatively small, efficient vessel. Axial spacing of the filter tubes within and over the length of the separation chamber permits use of longer tubes than has been previously known in the art thus extending the life of the tubes and reducing maintenance efforts. Distribution of the gas flow within the separation chamber as has been described effectively eliminates carryover of liquid into the outlet stream of the gas thereby producing a clean and relatively liquid-free gas stream.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, shape, size and arrangement of parts may be resorted to without departing from the spirit and scope of the invention as hereinafter claimed.

What is claimed is:

1. A separator for separating foreign solids and entrained liquid particles from a gas stream, comprising, an elongate horizontal tubular vessel having a sidewall and closed ends, first and second spaced partitions extending transversely and interiorly of the vessel and dividing the vessel into inlet, separation and terminal chambers, inlet means extending through the sidewall, communicating with said inlet chamber for introducing the gas stream into said inlet chamber through the sidewall of the vessel for imparting a generally circuitous flow to said gas, filter compartment conduit means axially spaced within the vessel and extending from the inlet chamber to the terminal chamber through the first and second partitions, a third partition extending transversely secured within said filter compartment means adjacent the terminal chamber and having apertures therein providing communication between the filter compartment means and the terminal chamber, a plurality of spaced filter tube means mounted within and axially extending substantially the length of the filter compartment means and sealably projecting through the apertures in the third partition for conducting the gas stream through the filter tube means and into the terminal chamber whereby foreign solids are trapped on said filter tube means and restricted from entering said terminal chamber, a conduit mounted in the separation chamber providing communication between the bottom of the terminal chamber and the bottom of the separation chamber, said conduit extending substantially the length of the bottom of the separation chamber and having a plurality of flow slots spaced therein whereby the gas stream is distributed in a generally even flow pattern over substantially the length of the separation chamber, liquid coalescing means secured within and extending across the length and width of the separation chamber for condensing liquid particles from the gas as said stream passes from the bottom to the top of the separation chamber, a drainage pipe within the bottom of the inlet chamber for drawing off liquid and foreign solids from said chamber, a drainage pipe within the bottom of the terminal chamber for drawing off condensed liquid from the terminal and separation chambers, and outlet means for removing the gas stream from the top of the separation chamber.

2. The invention of claim 1 wherein each filter tube means comprises, a tubular member having perforations along substantially its length, said tubular member being blocked at its end within the inlet chamber and open at its end adjacent the terminal chamber, and filtration media covering said tubular member.

3. The invention of claim 1 wherein the liquid coalescing means secured within and across the length and width of the separation chamber for condensing liquid particles from the gas stream comprises, at least one layer of wire mesh secured to the walls of the vessel.

4. The invention of claim 1 wherein the outlet means for removing the gas stream from the top of the separation chamber comprises, a horizontal conduit communicating with the exterior of the vessel and spaced below the top of the vessel wall, said conduit having upper ports for conducting the gas stream from the separation chamber.

5. The invention of claim 1 wherein the filter compartment conduit means forming a flow passage from the inlet chamber to the terminal chamber includes, additionally, an extension of said filter compartment means into the inlet chamber forming a peripheral shield around the filter tube means for limiting transverse flow and promoting axial flow of the gas stream through said filter compartment means.

6. A separator for separating foreign solids and entrained liquid particles from a gas stream, comprising, an elongate horizontal tubular vessel having a sidewall and enclosed ends, first and second spaced partitions extending transversely and interiorly of the vessel and dividing the vessel into inlet, separation and terminal chambers, an inlet conduit secured within the sidewall extending into the inlet chamber of the vessel for introducing the gas stream into said inlet chamber, a filter compartment conduit axially spaced within the vessel and extending from the inlet chamber to the terminal chamber through the first and second partitions, said filter compartment conduit having an extension into the inlet chamber whereby a peripheral shield is formed around filter tube means to limit transverse flow and promote axial flow of the gas stream through said filter compartment, a third partition transversely secured within said filter compartment conduit adjacent the terminal chamber and having apertures therein providing communication between the filter compartment and the terminal chamber, a plurality of spaced filter tubes mounted within and axially extending substantially the length of the filter compartment conduit and sealably projecting through the apertures in the third partition, said filter tubes each comprising a tubular member having perforations along substantially its length and being blocked at its end within the inlet chamber and open at its end adjacent the terminal chamber and having filtration media covering said tubular member, a conduit providing communication between the bottom of the terminal chamber and the bottom of the separation chamber, said conduit positioned in and extending substantially the length of the bottom of the separation chamber and having flow slots spaced therein whereby the gas stream from the terminal chamber is distributed in a generally even flow pattern over substantially the length of the separation chamber, at least one layer of wire mesh secured within and extending across the length and width of the separation chamber, a drainage pipe within the bottom of the inlet chamber for drawing off liquid and foreign solids from said chamber, a drainage pipe within the bottom of the terminal chamber for drawing off condensed liquid from the terminal chamber and separation chambers, and a gas outlet conduit secured within the top of the separation chamber communicating with the exterior of the vessel and having a plurality of upper ports for conducting the gas stream from the separation chamber.

References Cited

UNITED STATES PATENTS

| | | | |
|---|---|---|---|
| 2,429,751 | 10/1947 | Gohr et al. | 55—97 |
| 2,649,928 | 8/1953 | Durham | 55—319 |
| 3,009,536 | 11/1961 | Glasgow | 55—174 |
| 3,010,537 | 11/1961 | Baker | 55—323 |
| 3,025,928 | 3/1962 | Heath | 55—183 |
| 3,043,072 | 7/1962 | Walker et al. | 55—170 |
| 3,048,275 | 8/1962 | Headrick. | |
| 3,085,690 | 4/1963 | May | 210—315 |
| 3,212,234 | 10/1965 | McMinn | 55—178 |

FOREIGN PATENTS 847,222   9/1960   Great Britain.

HARRY B. THORNTON, *Primary Examiner.*

B. NOZICK, *Assistant Examiner.*